(12) United States Patent
Frommann

(10) Patent No.: US 8,603,336 B2
(45) Date of Patent: Dec. 10, 2013

(54) METHOD AND DEVICE FOR TRANSMITTING HEAT BETWEEN WASTE WATER LOCATED IN A TANK AND A FLUID

(75) Inventor: Christian Frommann, Neumarkt (DE)

(73) Assignee: Huber SE, Berching (DE)

( * ) Notice: Subject to any disclaimer, the term of this patent is extended or adjusted under 35 U.S.C. 154(b) by 723 days.

(21) Appl. No.: 12/447,585

(22) PCT Filed: Sep. 12, 2007

(86) PCT No.: PCT/EP2007/059606
§ 371 (c)(1),
(2), (4) Date: Apr. 28, 2009

(87) PCT Pub. No.: WO2008/052839
PCT Pub. Date: May 8, 2008

(65) Prior Publication Data
US 2010/0065250 A1  Mar. 18, 2010

(30) Foreign Application Priority Data
Oct. 28, 2006 (DE) .......................... 10 2006 050 922

(51) Int. Cl.
*B01D 21/02* (2006.01)
*B01D 21/04* (2006.01)
*F28G 13/00* (2006.01)
*F28F 13/12* (2006.01)
*F28F 1/00* (2006.01)

(52) U.S. Cl.
USPC ...... 210/256; 210/159; 210/170.06; 210/175; 210/179; 210/236; 210/252; 210/257.1; 165/95; 165/109.1; 165/172; 165/177

(58) Field of Classification Search
USPC ............ 210/156, 158, 159, 170.06, 175, 178, 210/179, 232, 236, 252, 256, 257.1, 383, 210/386, 391, 407, 408, 409; 165/95, 165/109.1, 157, 172, 173, 177
See application file for complete search history.

(56) References Cited

U.S. PATENT DOCUMENTS 4,671,351 A  6/1987  Rappe
6,022,474 A  2/2000  MacKelvie
(Continued)

FOREIGN PATENT DOCUMENTS

| DE | 3605585 A1 | 8/1987 |
|---|---|---|
| EP | 0174554 A1 | 3/1986 |
| EP | 1310602 A2 | 5/2003 |
| EP | 1854524 | 11/2007 |

OTHER PUBLICATIONS

German Search Report in German, for 10 2006 050 922.6, Oct. 28, 2006.

(Continued)

*Primary Examiner* — John Kim
(74) *Attorney, Agent, or Firm* — Dority & Manning, PA

(57) ABSTRACT

A method for transferring heat includes flowing a wastewater through a tank and flowing a fluid through a heat exchanger having an outer surface. The method further includes aerating the wastewater to produce a convective flow, contacting the outer surface of the heat exchanger with the convective flow to exchange heat, and cleaning the outer surface of the heat exchanger with the convective flow. A system for transferring heat includes a tank, a heat exchanger with an outer surface disposed in the tank, and a fluid flowing through the heat exchanger. Wastewater located in the tank flows over the outer surface of the heat exchanger, and a diffusion pipe disposed in the tank provides air into the tank to produce a convective flow in the wastewater.

20 Claims, 3 Drawing Sheets

(56) References Cited

U.S. PATENT DOCUMENTS

| | | |
|---|---|---|
| 6,513,580 B1 | 2/2003 | Bourdel |
| 6,517,733 B1 * | 2/2003 | Carlson .................. 210/785 |
| 2005/0173102 A1 * | 8/2005 | Jung ........................ 165/157 |
| 2008/0185321 A1 | 8/2008 | Beaulieu |

OTHER PUBLICATIONS

PCT/EP2007/059606 International Written Opinion and Search Report Jan. 23, 2008.

* cited by examiner

METHOD AND DEVICE FOR TRANSMITTING HEAT BETWEEN WASTE WATER LOCATED IN A TANK AND A FLUID

FIELD OF THE INVENTION

The present invention relates to a process for transferring heat between wastewater located in a container and a fluid by means of a heat exchanger through which the fluid flows. The heat exchanger has an outer surface contacted by the wastewater, and a convective flow is produced in the wastewater that moves the wastewater along the outer surface and to an apparatus for carrying out the process.

BACKGROUND OF THE INVENTION

The wastewater can be domestic, municipal, trade or industrial wastewater. The fluid can be, for example, water, an aqueous solution, alcohol or oil. Heat is transferred from the wastewater to the fluid to either cool the wastewater or heat the fluid. In particular, the heated fluid can be conducted in a circuit by a heat pump in order to render the wastewater heat utilizable for heating purposes. Inversely, however, heat can also be transferred from the fluid to the wastewater in order to heat the latter and thus make it easier to be treated.

The container can be a closed tank or an open basin. Wastewater can flow continuously through the container, or wastewater is supplied to and removed from the container in batches.

The heat exchanger is a hollow body through the interior of which the fluid flows and whose outer surface is in contact with the wastewater. Heat is transferred through at least one wall of the heat exchanger which wall preferably consists of sheeting that conducts heat well when the fluid and the wastewater have a different temperature. The thermal transfer capacity of the heat exchanger is proportional to the outer surface contacted by the wastewater, to the temperature difference of the two fluids and to a coefficient of thermal transfer (the k value). The k value is the inverse value of a thermal transfer resistance. This resistance is the stun of the resistances to the thermal transfer by the fluid on the wall, to the thermal conduction through the wall and to the thermal transfer from the wall into the surrounding wastewater. The resistance to the thermal conduction through the wall is proportional to the wall thickness and inversely proportional to the thermal conductivity of the wall material, thus, conditioned by the construction type of the heat exchanger. The resistances to the transfer of heat from the fluids into the wall and vice versa are, on the other hand, not only a function of the properties of the fluids (in particular of their thermal conductivities, viscosities and thermal capacities) but rather are also a function in particular of their flow behaviors. The inverse values of the inner and outer heat transfer resistances are coefficients of thermal transfer (alpha values).

Alpha values are low, that is, the heat transfer is poor, when fluids are at rest. The thermal transport is then dependent on the moderate thermal conduction as a consequence of diffusion and on natural convection, that is, a flow produced by the changed density of the fluids when they are heated or cooled off on the wall. Significantly better, that is, higher alpha values, can be achieved by forced convection, that is, artificially produced flows on the wall. Flows are characterized by their Reynolds number (Re), that is proportional to the flow rate and to a characteristic geometric length (e.g., the diameter of a tube) and inversely proportional to the kinematical viscosity of the fluid.

In the case of a low Re number, a flow is laminar and upon exceeding a critical Re number it changes into a turbulent flow, and the alpha value rises sharply. When heat exchangers are used, it should therefore be attempted to have both fluids flowing turbulently. It is simple to produce a turbulent flow in the fluid that is pumped through the heat exchanger in that the flow rate is selected to be sufficiently high. It is not very useful for the k value to further raise the inner alpha value more and more if the outer alpha value remains low. Then, the required thermal transfer capacity can only be achieved by a sufficiently large outer surface of the heat exchanger, which has the disadvantage that the heat exchanger becomes large and expensive. In order to avoid this, a convective flow, preferably a turbulent flow must be produced in the wastewater along the outer surface of the heat exchanger.

This flow should preferably pass over the outer surface, i.e., it should have a direction approximately parallel to the outer surface. The alpha value is raised by a defined and high flow rate over the outer surface of the heat exchanger and problematic solids and coatings are washed off the outer surface, for which reason the outer surface can be dimensioned to be small and the cost of the heat exchanger remains low.

It is state of the art to incorporate heat exchangers in wastewater conduits or drains in order to transfer heat between the wastewater and a fluid flowing through the heat exchanger. The wastewater flows in the conduit or drain past the outer surface of the heat exchanger. However, the flow rate is a function of the wastewater throughput through the conduit or the drain as well as of the level in it. Neither the flow rate nor the level are constant, so that no defined flow is present. The flow is normally laminar. Turbulent flow conditions prevail only when the flow rate has been greatly elevated, for example, after an occurrence of rain. As a result of the normally low alpha value on the surface of the heat exchanger, it must have a large surface. They are susceptible to contamination, especially if they are incorporated into raw wastewater conduits.

The published application DE 101 56 253 A1 teaches the integration of a heat exchanger into an industrial water tank in order to be able to make further use of the thermal energy present in the industrial water at another location. For this, the industrial water must be intermediately stored in the tank, during which it is preferably churned by blowing in air. As a result of this churning, the industrial water flows past the outer surface of the heat exchanger, which should improve the exchange of heat and at the same time wash contaminations off the outer surface of the heat exchanger.

Also, the published application DE 36 05 585 A1 teaches a heat exchanger incorporated in a wastewater container on the outer surface of which heat exchanger a convective flow is produced. In this instance the flow is produced by moving flexible walls of the wastewater container.

European patent EP 0 174 554 B1 also teaches a heat exchanger incorporated in a container for contaminated water in which a wash gas is blown into the water under the heat exchanger in order to clean the outer surface of the housing and to improve the thermal transfer.

According to these publications, convective flows are produced on the outer surfaces of heat exchangers for the purpose of improving the thermal transfer and cleaning contaminants off the outer surfaces. The heat exchangers here are always housed in a container arranged extra for this purpose in which the water is intermediately stored or must be conducted through a relatively expensive flow conduit which for its part is formed by a plurality of heat exchangers. However, these apparatuses significantly increase the investment and operating costs of the heat exchangers.

The present invention has the problem of making available a process and an apparatus for carrying out the process that do not have the cited disadvantages and makes possible a simple and economical utilization of the thermal energy present in wastewater. in particular, the invention has the problem of using already existing apparatuses additionally for the thermal exchange so that the energy balance can be further improved.

This problem is solved by the process and the apparatus in accordance with the features of the independent claims.

BRIEF SUMMARY OF THE INVENTION

According to the invention, wastewater flows through a container in which a heat exchanger is located during which a convective flow is produced that on the one hand serves as an aid for cleaning the wastewater and at the same time is also utilized for cleaning the outer surface of the heat exchanger as well as for improving the thermal transfer through the heat exchanger.

Containers through which a flow passes are a component of almost every wastewater purification plant and can be readily used for the thermal transfer between wastewater and industrial water. Apparatuses for producing convective flows that are used as aids for cleaning wastewater are frequently already present in such containers. Such flows can be generated, for example, by agitation mechanisms or by blowing a gas such as air into the wastewater. The use of these convective flows for cleaning wastewater can provide benefits, for example, in that bottom deposits are avoided, that the wastewater is thoroughly mixed, that chemicals are mixed into the wastewater, that a precipitation or flocculation is accelerated, or that the wastewater is aerated. Therefore, flow conditions are already present at very different locations in a wastewater purification plant that can be additionally utilized for their actual task of improving the thermal transfer on a heat exchanger or for cleaning the surface of the heat exchanger.

If these prerequisites are present, it can be readily achieved that the thermal energy of the wastewater of a wastewater purification plant can be utilized by incorporating a heat exchanger at a suitable location of a container of this wastewater purification plant through which container a flow passes. The energy to be expended is limited here solely to the operation of a possibly present pumping apparatus that brings about the transport of the fluid through the heat exchanger as well as possibly to the operation of an additionally present heat pump. Since the convective flows serve to clean the wastewater as well as to recover heat, the expense for this occurs only once. Also, the wastewater does not have to be intermediately stored in an expensive manner in a tank, but rather the incorporation of the heat exchanger inside containers through which a flow passes and that serve to clean wastewater is suggested, since as a consequence the investment and energy costs can be further lowered.

The wastewater cleaning can take place in an industrial operation or in a municipal sewage treatment plant. It can also be, in particular, a decentralized wastewater cleaning in hotels, apartment complexes or office complexes, playgrounds or local areas. A decentralized wastewater treatment is especially suitable for the task of heating the wastewater by a heat pump for heating, since in this instance the wastewater is comparatively warm and there is a great requirement for heating warmth in the local area.

According to an especially advantageous embodiment of the process of the invention, the convective flow is produced in the wastewater container by a pressurized aeration. In a pressurized aeration, air is blown into the wastewater in order to supply microorganisms with oxygen and to remove gaseous metabolic products such as carbon dioxide or nitrogen. When air is forced into the wastewater, air bubbles rise in the wastewater and entrain the surrounding wastewater. A strong upward flow is produced in the area of the container into which the air is forced, and at another location a corresponding downward flow is produced. In a suitable arrangement of the aeration apparatus, a pronounced flow vortex with flow rates of several meters per second can be produced with low energy consumption in the container. The air is preferably supplied below or obliquely below the heat exchanger so that the upward flow receives turbulence around the rising air bubbles. However, it is also possible to arrange the heat exchanger at a location at which the flow is downwardly directed. In both instances, the outer surface of the heat exchanger should have an approximately vertical alignment so that the wastewater flows with low flow resistance over the outer surface. Finally, it is also possible to arrange the heat exchanger at a location at which the flow has a horizontal component, in which case the outer surface is preferably aligned parallel to the direction of flow.

The convective flow is produced in the container advantageously and optionally alternatively or additionally to other measures by surface aeration. Surface aeration apparatuses are either tops with a vertical axis or rollers with a horizontal axis that throw a mixture of wastewater and activated sludge into the air or force air bubbles into the mixture in order to aerate it. The surface aeration apparatuses generate the necessary strong convection flow in the aeration tank.

A further advantageous embodiment of the invention suggests that the wastewater is aerated with compressed air in a container, for example, a sand trap, as will be described in detail in the following, and that rising air bubbles produce a vortex-like flow of the wastewater. A vortex-like flow is produced in particular in longitudinal containers by blowing in air in the vicinity of a side wall of the container. However, in wide containers even a double flow vortex can be produced in that air is forced in the vicinity of the central longitudinal axis of the container. The heat exchanger is preferably arranged in a region in which the blown-in air bubbles rise upward and produce an upwardly directed flow of the wastewater. However, it is also possible to place the heat exchanger at a location at which the wastewater flows back down.

According to an especially advantageous variant of the invention, a toroidal flow of the wastewater is produced in the container. A toroidal flow is preferably produced in containers with a circular or approximately quadratic base area. Usually, the wastewater flows up in the center and down on the periphery. However, the flow can also have the inverse direction.

In a further embodiment of the process in accordance with the invention, the flow is advantageously produced in the container by an agitator. This can be agitators that produce an axial or a radial flow. The type of agitator and its arrangement are in particular a function of the shape of the container. In the case of long, rectangular containers, horizontal propeller agitators are preferably used that produce a flow along the longitudinal axis of the container. In the case of a round or quadratic containers, agitators are preferably arranged on the vertical central axis. The latter comprise either agitating vanes that produce a rotary flow or comprise downwardly or upwardly directed propellers that produce a toroidal flow or annular vortex flow in the container. Even in all these instances, the heat exchangers are preferably arranged in such a manner that their outer surfaces are aligned parallel to the flow.

In addition, it is advantageous if the wastewater is cleaned in a sand trap. Sand traps serve to separate solids with a high specific density, that is, e.g., sand, fine gravel and stones. A convective flow is produced in sand traps that is dimensioned in such a manner that on the one hand organic substances are held in suspension and on the other hand a sinking of mineral substances is not prevented. This convective flow can additionally be utilized to elevate the alpha value on the outer surface of heat exchangers arranged in the sand trap. The convective flow produced in sand traps by the separation of sand is very strong and unambiguously pronounced. It can therefore be used especially well for flowing onto heat exchangers. Sand trap containers are frequently manufactured from steel and delivered complete with all fittings. It is therefore especially economical to integrate heat exchangers from the factory into sand trap containers.

According to a further advantageous variant, the wastewater is biologically purified. The biological purification usually takes place in an aeration basin of an activated sludge plant. Part of every activated sludge plant is an aeration basin in which a mixture of wastewater and activated sludge is aerated in order to supply the microorganisms in the activated sludge with oxygen and in order to discharge the metabolic product carbon dioxide and, if necessary, nitrogen. Aeration basins are usually equipped with a pressurized aeration in which air is blown into the wastewater. It is especially advantageous to mount heat exchangers above the site at which air is forced in. When a heat exchanger is incorporated in an existing aeration basin with pressurized aeration, the already present convective flow is also utilized without additional cost for the thermal exchange. However, aeration basins of activated sludge plants can also be equipped with surface aeration apparatuses that produce a convective flow.

In order to carry out the described process, an apparatus is suggested for transferring heat between wastewater located in the container and between a fluid by means of a heat exchanger through which the fluid flows and with an outer surface contacted by the wastewater, in which wastewater a diffusion pipe is arranged for forcing in air and/or an agitator is arranged that serve to produce a convective flow. According to the invention, the container is here a basin of the wastewater purification plant through which basin wastewater flows. Such basins already frequently comprise apparatuses for the production of convective flows that support the action of mechanical, biological and/or chemical purification stages. In order to keep the energy required for the thermal exchange as low as possible, it is suggested that heat exchangers be integrated in such containers through which wastewater flows since the flow conditions that are favorable for the transfer of heat are already present in them. Thus, the apparatus in accordance with the invention promises an especially favorable energy balance by the combination of wastewater purification and the recovery of heat. Furthermore, significant investment costs are saved because neither an additional container nor apparatuses for the production of flow are required for the recovery of heat.

Basins through which wastewater flows are containers provided with an inlet and an outlet. They are a component of practically every wastewater purification plant. The basins can be open or closed at the top. The diffusion pipe is a horizontally arranged pipe to which compressed air is fed and that is provided with openings through which the air is pressed in the form of coarse bubbles into the wastewater. The diffusion pipe can alternatively be provided with porous or slotted aeration elements through which the air is forced into the wastewater in the form of bubbles that are more or less fine.

The basin through which the flow passes is advantageously an aeration basin of an activated sludge plant that serves for the biological purification of wastewater and in which a convective flow is produced by aeration apparatuses. In activated sludge plants, organic components in the wastewater are metabolized by microorganisms and converted into biomass. The biomass is separated in a final clarification, for example, in a final clarification basin, as so-called activated sludge and returned to the aeration basin. The growth of biomass is removed from the final clarification as so-called excess sludge.

According to an especially advantageous embodiment, the basin is a sand trap. A mechanical pre-purification of wastewater takes place in sand traps by the separation of specifically heavy particulate sinking matter. To this end a convective flow is produced that is so strong that it holds specifically less dense organic substances in suspension.

In a further embodiment, the sand trap is advantageously a round sand trap in whose center an agitator producing a toroidal flow is arranged. Agitator apparatuses are usually incorporated in round sand traps in order to produce a rotating and toroidal flow so that the wastewater flows in a spiral path over the bottom of the sand trap to the center. Mineral solids are pushed by this flow in the direction of the center and sink down, for example, through an annular slot into a collection chamber located underneath the bottom. It is suggested that heat exchangers be arranged on the circumference of the round sand trap on which the wastewater flows down. Alternatively, they can also be arranged annularly around the agitator apparatus, in which case the wastewater flows upward in these regions.

Alternatively, it is advantageous if the sand trap is a long sand trap with a side wall and at least one diffusion pipe arranged in the vicinity and along the longitudinal wall for blowing in air and producing a vortex-like flow. In long sand traps, a vortex flow is customarily produced by blowing in compressed air along one of the longitudinal walls. According to the invention, this vortex flow is additionally utilized to improve the thermal transfer of the heat exchanger arranged in the aerated sand trap.

In another embodiment of the invention, the heat exchanger advantageously comprises an inlet and outlet for the fluid that are connected to one another by at least one flow conduit, the outer surfaces of which flow conduit form the outer surface of the heat exchanger. The fluid flows in a preferably turbulent manner through the flow conduit from the inlet to the outlet. In order to keep the flow rate low and the temperature difference between inlet and outlet high, the flow conduit should have a small hydraulic diameter and be long. The flow conduit is delimited by walls whose at least one outer surface forms the outer surface of the heat exchanger. The fluid flows along inner surfaces of the walls and the wastewater flows along the outer surfaces of the walls.

Furthermore, it is especially advantageous if the flow conduit is formed by pipe sections with a circular, rectangular or quadratic cross-sectional surface. Thus, the flow conduit is manufactured from a sequence of commercial pipe profiles whose jacket surfaces form the outer surface of the heat exchanger.

In an especially advantageous embodiment, the pipe sections are aligned substantially horizontally. This alignment is especially advantageous if the container in which the heat exchanger is arranged is flat. In this instance the flow against the pipes is oblique.

However, in special instances, for example, in deep containers, it can be advantageous if the pipe sections are aligned substantially vertically. In this instance the flow against the pipes is longitudinal, which has the advantage that the pipes produce a low flow resistance and thus impair the convective flow in the basin only slightly.

The pipe sections are advantageously arranged in parallel and have ends that are connected to each other in such a manner on the fluid side that the fluid flows in opposite directions in adjacent pipe sections. Therefore, the fluid flows back and forth in the parallel pipe sections. This brings it about in a simple manner that the heat exchanger has a long flow conduit in spite of small dimensions. The connection between adjacent pipe sections can take place by vertical connection pipes. If rectangular or quadratic pipe sections are arranged parallel to each other without spacing, their ends can be connected to each other by openings, for example, bores.

According to another advantageous variant of the invention, the flow conduit is formed by at least one hollow profile arranged in the form of a helix, which helix has a vertical axis.

The hollow profile can be, for example, a circular or rectangular pipe profile. Even in this variant pipes are arranged in parallel in order to form a long flow conduit. Due to the lack of sharp deflections the flow resistance on the fluid side is especially low. This variant is especially suited for round containers.

In another advantageous embodiment, the outer surface of the heat exchanger runs substantially parallel to the convective flow and is level or corrugated. The heat exchanger should have the lowest possible flow resistance for the convective flow. Therefore, its outer surface should run parallel to the flow so that the wastewater can flow without hindrance over the outer surface. If rectangular profiles are arranged in parallel without spacing or with little spacing they form a level outer surface for the flow. If profiled sheets as in modern heaters are connected to each other they have a corrugated outer surface. Even if round pipes are arranged in parallel, they form an approximately corrugated outer surface even if there is a spacing between the pipes. This is then an encasing imaginary outer surface.

It is also advantageous if the outer surface of the heat changer is an inner surface of the container wall at the same time. In this embodiment, the heat exchanger is an integral component of a wall of the container. This has the advantage that the heat exchanger produces no additional resistance or only a very low additional resistance for the convective flow.

There are also advantages if the flow conduit of the heat exchanger is formed by hollow spaces between the container wall and profiles attached to it. The profiles are partial profiles such as half pipes, U-profiles or L-profiles. The profiles can be attached on the inside of the container wall. However, in metal containers the profiles can also be attached on the outer side of the container wall so that the container wall forms the heat-transferring outer surface of the heat exchanger.

In another advantageous embodiment the apparatus comprises movable brushes for cleaning the outer surface of the heat exchanger. The brushes are moved by a drive over the outer surface of the heat exchanger in order to remove adhering solids or coatings.

Alternatively, the outer surface of the heat exchanger is advantageously cleaned by movable spray nozzles. The sprayed water is preferably removed from the outlet of the wastewater purification plant, so that it is largely free of solids and does not clog the nozzles.

Further advantages of the invention are described in the following exemplary embodiments.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
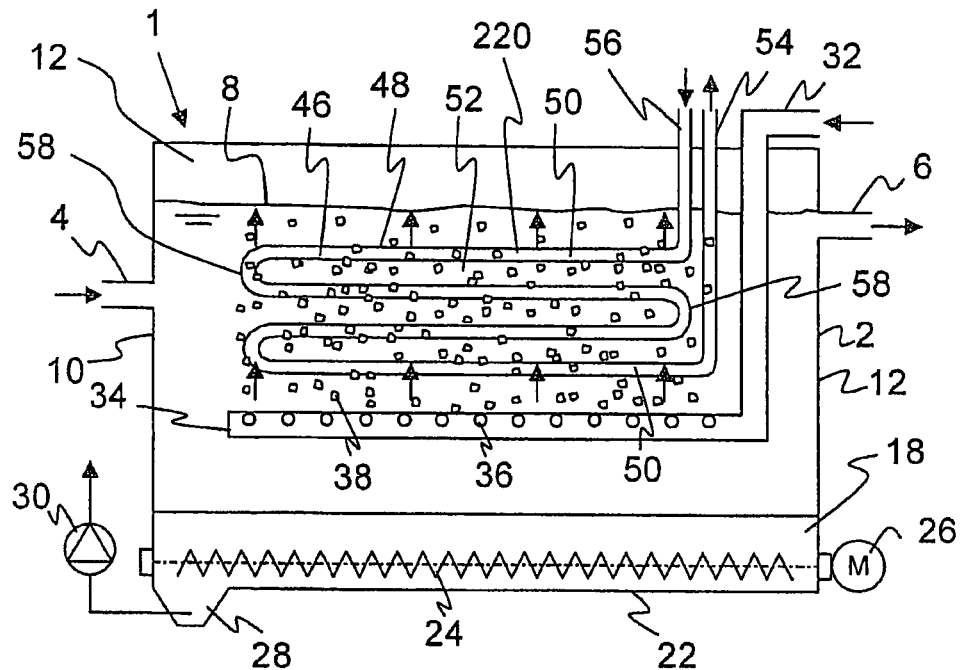
FIG. 1 shows a schematic longitudinal section through an aerated long sand trap with a heat exchanger arranged in it.
Figure 2:
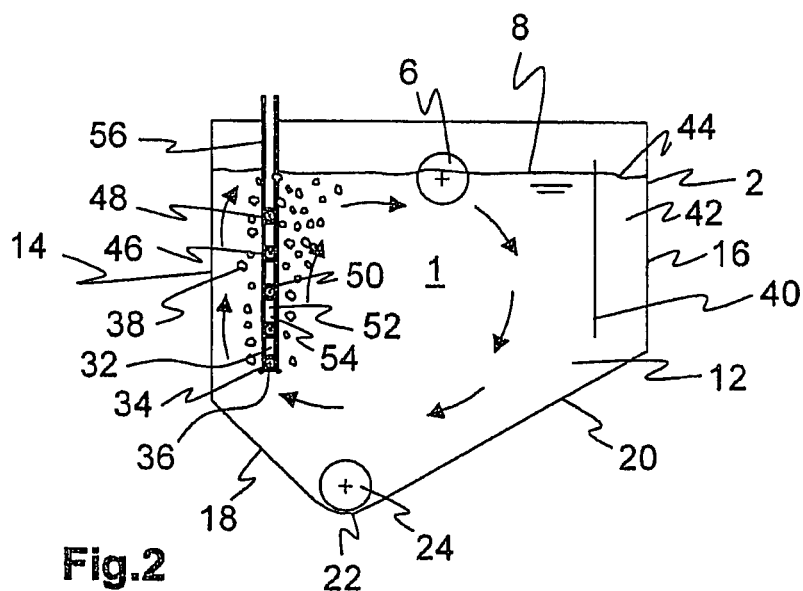
FIG. 2 shows a schematic cross section through the aerated long sand trap of FIG. 1.

FIGS. 1, 2 show a sand trap 1 with a rectangular base area, Sand trap 1 consists of a basin 2 with an inlet 4 and an outlet 6 for wastewater flowing through sand trap 1. Basin 2 can be manufactured from concrete, metal or plastic. Basin 2 is filled with wastewater up to a certain water level 8. Basin 2 has vertical front walls 10, 12 and side walls 14, 16 as well as oblique bottom areas 18, 20 inclined to a drain 22 so that sand settling in sand trap 1 slides into drain 22. A worm conveyor 24 is arranged in drain 22, is driven by a motor 26 and pushes the separated sand to a sump 28. The sand is discharged from sump 28 by a pump 30 and usually delivered to a sand classifier or sand washer (not shown). Pump 30 can be a rotary pump or also an air-lift pump (a compressed-air lift pump).

Represented sand trap 1, a long sand trap in this exemplary embodiment, is aerated. Air is supplied from a blower (not shown) via a pressure line 32 to a diffusion pipe 34 arranged horizontally in the vicinity of side wall 14, which pipe is provided with holes 36 through which the air is forced into the wastewater. The forced-in air rises in the wastewater in the form of air bubbles 38 to water level 8 and produces a strong convection flow above diffusion pipe 34 that is directed upward, parallel to side wall 14. In the vicinity of the opposite side wall 16, the wastewater flows down and back to diffusion pipe 34. Thus, the aeration produces an approximately vortex-like flow in sand trap 1 indicated in the figures by arrows. The flow over bottom areas 18, 20 is so strong that organic solids with a low density such as feces are swirled upward but on the other hand mineral substances with a high density remain lying on bottom areas 18, 20. The wastewater flows downward above the slightly inclined bottom surface 20 and pushes sand deposited on it to drain 22. This avoids organic bottom deposits, and the wastewater is thoroughly mixed, so that even chemicals can be mixed better into the wastewater. In addition, precipitations or flocculations are accelerated, as a result of which an improved wastewater purification can take place.

A separating wall 40 separates a fat catch chamber 42 from sand trap 1. Separating wall 40 customarily comprises perforations (not shown) through which floating substances such as fats and oils pass into fat catch chamber 42 screened from the flow, rise up in it and form a floating layer 44 on water level 8. Floating layer 44 is pushed by a removal shield (not shown) along fat catch chamber 42 to a funnel from which it can be discharged by a pump 30.

In the exemplary embodiment, a heat exchanger 46 with an outer surface 48 contacted by the wastewater is arranged in sand trap 1 below water level 8 and above diffuser pipe 34 and in the vicinity of side wall 14 in such a manner that the air bubbles 38 rise together with the flow produced in the wastewater along outer surface 48 of heat exchanger 46 and contribute to the cleaning of outer surface 48 of heat exchanger 46. However, heat exchanger 46 could also be arranged in the vicinity of the opposite side wall 16 or separating wall 40 or also above bottom surface 20, so that the wastewater flows down there on outer surface 48.

In the exemplary embodiment, heat exchanger 46 consists of a series of pipes 50 arranged in parallel between which there are intermediate spaces 52. However, heat exchanger 46 can also alternatively consist of other hollow profiles such as, for example, square profiles. It is also possible to arrange hollow profiles horizontally or vertically and without intermediate spaces 52.

Heat exchanger 46 comprises an inlet pipe 56 and an outlet pipe 54 for fluid flowing on the inside through heat exchanger 46 and its pipes 50 forming a long flow conduit 220. Pipes 50 are connected to each other on their ends by pipe turns 58 in such a manner that the fluid flows in opposite directions in adjacent pipes 50. This brings it about in the first place that flow conduit 220 through pipes 50 is as long as possible and has a large outer surface 48. In the second place, it is achieved that the fluid flows rapidly and therefore turbulently through heat changer 46 and successively through pipes 50 even in the case of a small flow rate so that the alpha value on the fluid side is high. In the third place, this makes it possible that heat exchanger 46 is short and compact in spite of a large outer surface 48.

Figure 3:
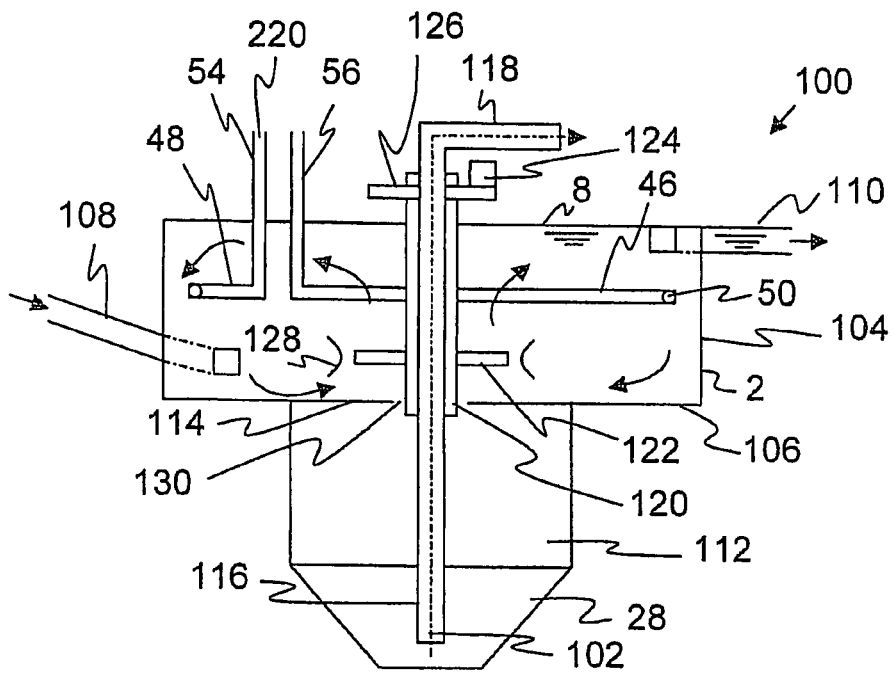
FIG. 3 shows a schematic longitudinal section through a round sand trap with an agitator and a heat exchanger arranged in it.

FIG. 3 shows a round sand trap 100 with a vertical axis 102, a circular basin 2, a circumferential wall 104, a bottom 106, an inlet conduit 108 and an outlet conduit 110. Inlet conduit 108 and outlet conduit 110 empty substantially tangentially into basin 2, so that a rotating flow is produced in it, and the pressure loss during the passing of wastewater through round sand trap 100 remains low. A collection chamber 112 is arranged underneath basin 2 for separated sand. Collection chamber 112 is separated by a bottom plate 114 from basin 2 and comprises a sump 28 from which an axial standpipe 116 runs, through which the separated sand is vertically drawn out of sump 28 by a pump apparatus or a compressed-air lift pump (not shown) and supplied through a line 118 to a sand classifier or sand washer (also not shown).

A rotating hollow shaft 120 on which propeller-like vanes 122 are attached is coaxially arranged around standpipe 116. Hollow shaft 120 is driven by a motor 124 via transmission 126, An axial upward flow of the wastewater is generated in basin 2 by rotation of vanes 122. The formation of this upward flow is supported by a guide ring 128 coaxially arranged around vanes 122. The wastewater flows radially outward under water level 8, and in the vicinity of circumferential wall 104, the wastewater flows downward. The water flows radially to hollow shaft 120 above bottom 106 and bottom plate 114 and back to vanes 122. The direction of the toroidal flow is indicated with arrows. This toroidal flow is overlaid by a rotational flow about vertical axis 102 which is generated on the one hand by the water flowing off tangentially through inlet conduit 108 and through outlet conduit 110 and on the other hand by the rotation of vanes 122.

Specifically dense solids such as sand are driven on the one hand by the rotating flow as a consequence of the so-called teacup effect and on the other hand by the toroidal flow directed radially inward above bottom 106 to the center of basin 2. They settle on bottom 106 and bottom plate 114 and are pushed in the direction of axis 102. An annular slot 130 is arranged between bottom plate 114 and hollow shaft 120 through which slot the sand sinks down into collection chamber 112. On the other hand, less dense organic matter is suspended by the flow and passes predominantly with the wastewater into outlet conduit 110. This brings it about that sand trap 1 has a good selectivity, which means that on the one hand less sand remains in the wastewater and on the other hand only slight amounts of organic matter are discharged with the sand.

A heat exchanger 46 is arranged in basin 2 under water level 8 and in the vicinity of circumferential wall 104. Fluid flows through an inlet pipe 56 and an annular pipe 50 to an outlet pipe 54. Annular pipe 50 forms a flow conduit 220 of heat exchanger 46. The fluid flows from outlet pipe 54 in a circuit via a heating or cooling apparatus, e.g., a heat pump (not shown), in which it is heated or cooled, back to inlet pipe 56. While the fluid is flowing through pipe 50, it cools down or is heated in that it gives off heat through an outer surface 48 of pipe 50 to the wastewater or receives heat from the wastewater. In the exemplary embodiment, heat exchanger 46 consists of only a single annular pipe 50, Of course, it can also consist of a helically formed pipeline.

Heat exchanger 46 is arranged in the exemplary embodiment in the vicinity of circumferential wall 104, where the wastewater flows down on outer surface 48 of heat exchanger 46. However, heat exchanger 46 can also be arranged at another site of the toroidal flow; for example, guide ring 128 can be designed as heat exchanger 46, in which case its outer surface 48 facing axis 102 is exposed to a very strong axial and rotating flow.

Figure 4:
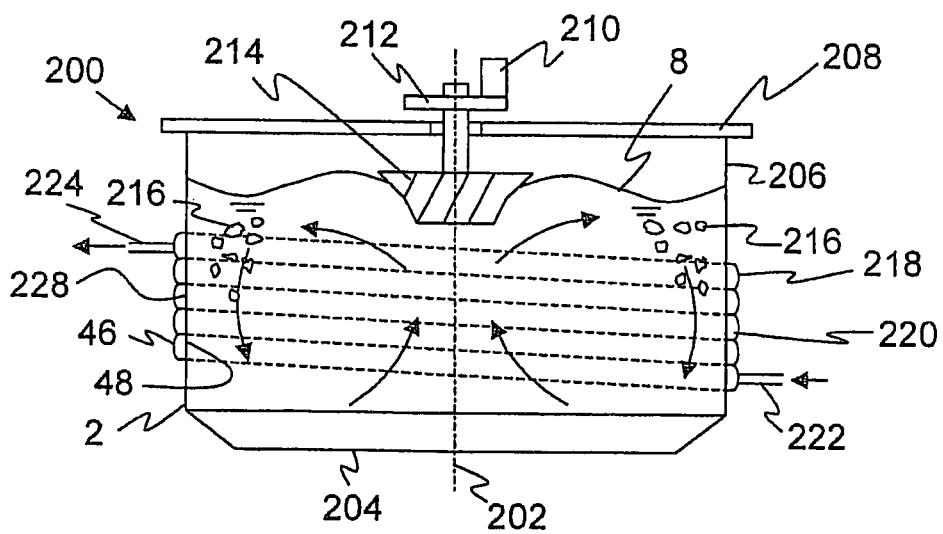
FIG. 4 shows a schematic longitudinal section through an aeration basin aerated with compressed air in which a heat exchanger is arranged.

FIG. 4 shows an aeration basin 200 with surface aeration. A mixture of wastewater and activated sludge is present in a basin 2. Basin 2 shown in the exemplary embodiment is circular, has a vertical axis 202, a base 204 and a circumferential wall 206 manufactured in the exemplary embodiment of metal sheeting. A bridge 208 for receiving a motor 210, a transmission 212 and an aeration top 214 rotating around vertical axis 202 is arranged above basin 2. Aeration top 214 draws the mixture of wastewater and activated sludge upward in the region of axis 202 and throws it radially outward above water level 8. At this time air bubbles 216 are charged into the mixture of wastewater and activated sludge that supply the mixture with oxygen. A pronounced toroidal flow is generated in basin 2 that is directed upward in the region of axis 202 and downward in the vicinity of circumferential wall 206.

Half pipe profiles 218 are attached around circumferential wall 206 in such a manner that a helical flow conduit 220 is formed between circumferential wall 206 and half pipe profiles 218 through which fluid flows from an inlet 222 to an outlet 224. Circumferential wall 206 and half pipe profiles 218 attached to it form a heat exchanger 46. The inside of circumferential wall 206 is at the same time an outer surface 48 of heat exchanger 46. The outer surface of circumferential wall 206 is at the same time an inner surface 228 of flow conduit 220, which runs through heat exchanger 46. The fluid flows through flow conduit 220 of heat exchanger 46, and the mixture of wastewater and activated sludge flows along outer surface 48 of heat exchanger 46. Thus, part of circumferential wall 206 serves to transmit heat from the wastewater into the fluid or vice versa.

In the case of a turbulent flow of the fluid in flow conduit 220 and of the wastewater on outer surface 48, high alpha values are achieved for the transmission of heat. Circumferential wall 206 should be as thin as possible in the region of heat exchanger 46 in order to achieve a good thermal conduction through circumferential wall 206. Since circumferential wall 206 is reinforced by the attached half pipe profiles 218, circumferential wall 206 can be made thin in the region of heat exchanger 46.

Half pipe profiles 218 that contact each other mutually are shown in the exemplary embodiment. However, they can also be attached with spacing. It is, of course, also possible to use angular profiles.

Figure 5:
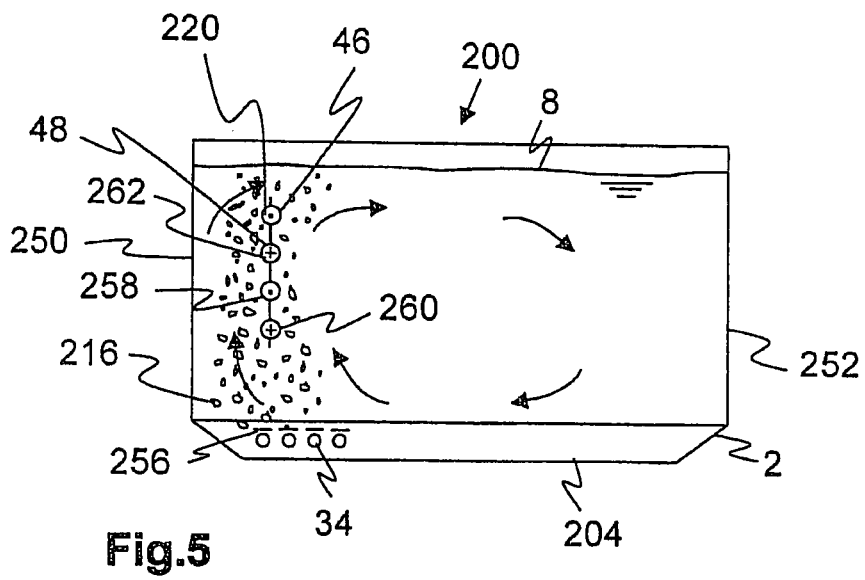
FIG. 5 shows a schematic longitudinal section through another aeration basin with a surface aeration in which a heat exchanger is arranged.

FIG. 5 shows an aeration basin 200 with pressure aeration. A rectangular basin 2 has a level base 204 and longitudinal walls 250, 252. Diffuser pipes 34 are arranged above base 204 and in the vicinity of the longitudinal wall 250 into which pipes compressed air is blown in by a blower (not shown). Aeration elements 256 are arranged on diffuser pipes 34 and are plate-shaped in the exemplary embodiment. However, even other, for example, pipe-shaped or plate-shaped aeration elements 256 can be used. Aeration elements 256 comprise porous bodies or slotted membranes through which supplied compressed air in the form of fine air bubbles 216 is charged into the wastewater. They rise up to water level 8 and generate an upwardly directed convective wastewater flow in the vicinity of longitudinal wall 250. The wastewater flows back down in the vicinity of the opposite longitudinal wall 252. A vortex-like flow is generated in basin 2 whose direction is indicated by arrows.

Heat exchanger 46 with a flow conduit 220 for fluid flowing through it is arranged at a site above aeration elements 256 at which the wastewater flows upward along an outer surface 48 of heat exchanger 46.

Heat exchanger 46 in this exemplary embodiment is formed by two corrugated sheets 258, 260 connected to one another in such a manner that longitudinal hollow spaces 262 are produced between them that form flow conduit 220. Adjacent hollow spaces 262 are connected to each other at their ends in such a manner that the fluid flows successively through several hollow spaces 262 in alternating directions. Sheets 258, 260 are aligned vertically so that the rising wastewater can flow along them without great resistance.

In the exemplary embodiment, heat exchanger 46 is oriented in such a manner that hollow spaces 262 extend horizontally. However, it would also be quite possible to arrange heat exchanger 46 rotated through 90 degrees so that hollow spaces 262 run vertically.

Figure 6:
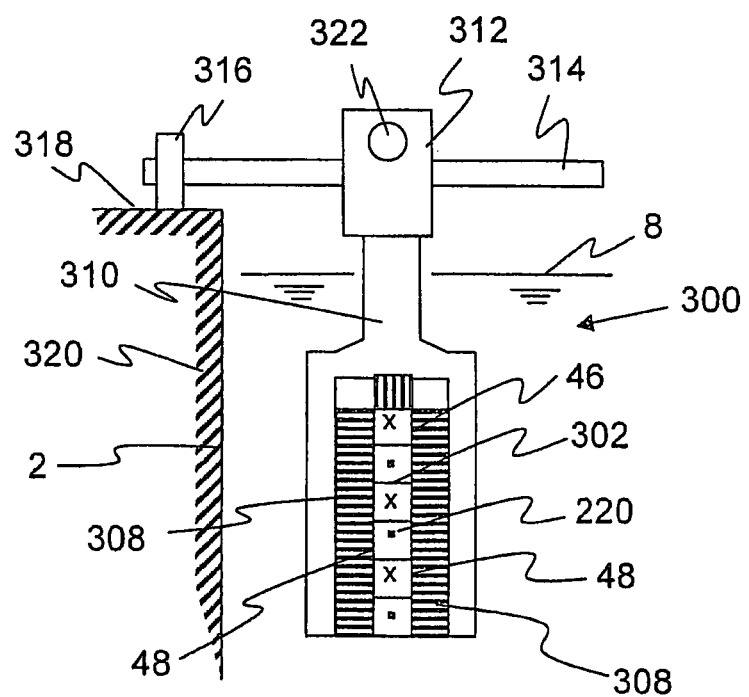
FIG. 6 shows an apparatus for cleaning the outer surface of a heat exchanger.

FIG. 6 shows a heat exchanger 46 arranged in a basin 2 and also shows a cleaning apparatus 300 in accordance with the invention. Heat exchanger 46 is manufactured from several square pipes 302 aligned in parallel and horizontally that form a flow conduit 220 for fluid and are provided on both ends with perforations, for example, bores (not shown) through which the fluid flows from one square pipe 302 into an adjacent one so that the fluid flows in opposite directions in adjacent square pipes 302.

Heat exchanger 46 has two parallel vertical outer surfaces 48 composed by opposite surfaces of square pipes 302. The wastewater flows convectively upward along vertical outer surfaces 48 of heat exchanger 46, which convective flow can be generated, for example, by blowing in air underneath heat exchanger 46.

Cleaning apparatus 300 comprises brushes 308 that can be moved horizontally over outer surfaces 48 of heat exchanger 46 in order to clean them from adhering solids and coatings. Brushes 308 are attached in a fork-shaped holder 310 connected to a transmission 312. At least one wheel shaft 314 with wheels 316 on both ends runs horizontally through transmission 312. Wheels 316 run on bearing surfaces 318 of basin wall 320 or on rails. Cleaning apparatus 300 is moved by rotation of a threaded rod 322 running through transmission 312. Alternately, it would of course also be possible to move cleaning apparatus 300 by a cable or chain drive. Instead of brushes 308, spray nozzles could also be arranged in cleaning apparatus 300.

The present invention was explained in detail using an exemplary embodiment. However, it is not limited to the example shown and described. Modifications within the scope of the protective claims are possible at any time.

The invention claimed is:

1. A system for transferring heat, comprising:
   a tank;
   a heat exchanger disposed in the tank, wherein the heat exchanger includes a substantially vertical outer surface of spaced apart tubes;
   a cleaning apparatus that moves along the substantially vertical outer surface of the heat exchanger;
   a fluid flowing through the heat exchanger;
   a wastewater located in the tank and flowing over the substantially vertical outer surface of the heat exchanger; and
   a diffusion pipe disposed in the tank, wherein the diffusion pipe provides air into the tank to produce a convective flow in the wastewater between the spaced apart tubes.

2. The system of claim 1, further including an agitator in the tank for producing the convective flow in the wastewater.

3. The system of claim 1, wherein the tank is in an activated-sludge plant.

4. The system of claim 1, wherein the tank is a sand trap.

5. The system of claim 4, wherein the sand trap is a round sand trap and further including an agitator that produces a toroidal flow.

6. The system of claim 4, wherein the sand trap is a longitudinal sand trap, and the diffusion pipe produces a vortex-like flow.

7. The system of claim 1, wherein the cleaning apparatus comprises brushes that move along the substantially vertical outer surface of the heat exchanger.

8. The system of claim 1, wherein the heat exchanger comprises a flow conduit having an inlet and an outlet.

9. The system of claim 8, wherein the flow conduit includes pipe sections having a circular, rectangular, or square cross-sectional area.

10. The system of claim 9, wherein the pipe sections are aligned substantially horizontally.

11. The system of claim 9, wherein the pipe sections are aligned substantially vertically.

12. The system of claim 9, wherein the pipe sections are arranged in parallel and the fluid flows in opposite directions in adjacent pipe sections.

13. The system of claim 8, wherein the flow conduit includes at least one hollow profile arranged in the form of a helix.

14. The system of claim 1, wherein the convective flow of the wastewater is substantially parallel to the substantially vertical outer surface of the heat exchanger.

15. The system of claim 1, wherein the substantially vertical outer surface of the heat exchanger is corrugated.

16. The system of claim 1, wherein the substantially vertical outer surface of the heat changer is an inner surface of the tank.

17. The system of claim 1, wherein the cleaning apparatus is connected to wheels on a bearing surface.

18. The system of claim 1, further comprising a transmission connected to the cleaning apparatus.

19. The system of claim 1, further comprising a threaded rod connected to the cleaning apparatus.

20. A system for transferring heat, comprising:
   a tank;
   a heat exchanger disposed in the tank, wherein the heat exchanger includes opposing substantially vertical outer surfaces of spaced apart tubes;

a cleaning apparatus that moves along the opposing substantially vertical outer surfaces of the heat exchanger;
a fluid flowing through the heat exchanger;
a wastewater located in the tank and flowing over the opposing substantially vertical outer surfaces of the heat exchanger; and
a diffusion pipe disposed in the tank, wherein the diffusion pipe provides air into the tank to produce a convective flow in the wastewater between the spaced apart tubes.

* * * * *